United States Patent [19]
Radigan et al.

[11] Patent Number: 6,002,879
[45] Date of Patent: Dec. 14, 1999

[54] METHOD FOR PERFORMING COMMON SUBEXPRESSION ELIMINATION ON A RACK-N STATIC SINGLE ASSIGNMENT LANGUAGE

[75] Inventors: Jim J. Radigan, San Jose; Vishesh M. Parikh, Mountain View, both of Calif.

[73] Assignee: Intel Corporation, Santa Clara, Calif.

[21] Appl. No.: 08/829,856

[22] Filed: Apr. 1, 1997

[51] Int. Cl.$^6$ ................................ G06F 9/45; G06F 9/44
[52] U.S. Cl. ........................ 395/789; 395/706; 395/708
[58] Field of Search .................................... 395/500, 707, 395/708, 709, 706

[56] References Cited

U.S. PATENT DOCUMENTS

| | | | |
|---|---|---|---|
| 5,287,510 | 2/1994 | Hall et al. | 395/709 |
| 5,327,561 | 7/1994 | Choi et al. | 395/709 |
| 5,448,737 | 9/1995 | Burke et al. | 395/709 |
| 5,475,842 | 12/1995 | Gilbert et al. | 395/706 |
| 5,584,027 | 12/1996 | Smith | 395/707 |
| 5,659,754 | 8/1997 | Grove et al. | 395/709 |
| 5,768,596 | 6/1998 | Chow et al. | 395/709 |

OTHER PUBLICATIONS

Cytron and Gershbein, "Efficient Accommodation of May–Alias Information in SSA Form", published at ACM, pp. 36–45, 1993.

Munehiro and Ken'ichi, "Efficient Partial Redundancy Elimination Based on Phi–Function Motion", Hoho Shori Gakkai Kenkyu Hokoku, vol. 95, No. 15, pp. 21–30, 1995.

*Primary Examiner*—James P. Trammell
*Assistant Examiner*—Demetra R. Smith
*Attorney, Agent, or Firm*—Arnold White & Durkee

[57] ABSTRACT

Briefly, in one embodiment, the invention is a method for eliminating common subexpressions in an initial SSA intermediate language representation of at least a portion of a computer program. The method includes (a) inserting a phi-node for an unambiguous definition used in an unambiguous subexpression reaching a join point in the initial intermediate language subsequent to the join point; (b) inserting a phi-node for the unambiguous common subexpression; (c) renaming the unambiguous definition and a subsequent use reached by the definition; and (d) renaming the unambiguous common subexpression.

45 Claims, 12 Drawing Sheets

| Initial Intermediate Language Representation | After Renaming Definitions & Uses | After Renaming Expressions |
|---|---|---|
| $i = 1$ | $t_1 = 1$ | $t_1 = 1$ |
| $a = i+2$ | $t_2 = t_1+2$ | $t_2 = t_1+2$ |
| $A[i] = a$ | $A[t_1] = t_2$ | $A[t_1] = t_2$ |
| $b = 2 * (i+2)$ | $t_3 = 2 * (t_1+2)$ | $t_3 = 2 * t_2$ |
| $c = A[i] * b$ | $t_4 = A[t_1] * t_3$ | $t_4 = A[t_1] * t_3$ |
| $d = (A[i] * b) - (2*c)$ | $t_5 = (A[t_1] * t_3) - (2*t_4)$ | $t_5 = (A[t_1] * t_3) - (2*t_4)$ |

Figure 4A

| Rank-0 Intermediate Language Representation | After Renaming Definitions & Uses | After Renaming Expressions |
|---|---|---|
| $t_1 = 1$ | $t_1 = 1$ | $t_1 = 1$ |
| $t_2 = t_1+2$ | $t_2 = t_1+2$ | $t_2 = t_1+2$ |
| $A[t_1] = t_2$ | $t_6 = t_2$ | $t_6 = t_2$ |
| $t_3 = 2 * t_2$ | $t_3 = 2 * t_2$ | $t_3 = 2 * t_2$ |
| $t_4 = A[t_1] * t_3$ | $t_4 = t_6 * t_3$ | $t_4 = t_6 * t_3$ |
| $t_5 = (A[t_1] * t_3) - (2*t_4)$ | $t_5 = (t_6 * t_3) - (2*t_4)$ | $t_5 = t_4 - (2*t_4)$ |

Figure 4B

| Initial Intermediate Language Representation | After Renaming Definitions, Uses & Expressions (Single Pass) |
|---|---|
| i = 1<br>a = i+2<br>A[i] = a<br>b = 2 * (i+2)<br>c = A[i] * b<br>d = (A[i] * b) - (2*c) | $t_1 = 1$<br>$t_2 = t_1+2$<br>$A[t_1] = t_2$<br>$t_3 = 2 * t_2$<br>$t_4 = A[t_1] * t_3$<br>$t_5 = (A[t_1] * t_3) - (2*t_4)$ |

Figure 4C

| Initial Intermediate Language Representation | After Renaming Definitions & Uses | After Renaming Expressions (Advanced Load) |
|---|---|---|
| i = 1 | $t_1 = 1$ | $t_1 = 1$<br>$t_6 = t_1 + 2$ |
| a = i+2 | $t_2 = t_1+2$ | $t_2 = t_6$ |
| A[i] = a | $A[t_1] = t_2$ | $A[t_1] = t_2$ |
| b = 2 * (i+2) | $t_3 = 2 * (t_1+2)$ | $t_3 = 2 * t_6$ |
| c = A[i] * b | $t_4 = A[t_1] * t_3$ | $t_4 = A[t_1] * t_3$ |
| d = (A[i] * b) - (2*c) | $t_5 = (A[t_1] * t_3) - (2*t_4)$ | $t_5 = (A[t_1] * t_3) - (2*t_4)$ |

Figure 4D

| Rank-0 SSA Intermediate Language Representation | Rank-1 After Renaming Definitions & Uses | Rank-1 After Renaming Expressions |
|---|---|---|
| $t_1 = 1$ | $t_1 = 1$ | $t_1 = 1$ |
| $t_2 = t_1 + 2$ | $t_2 = t_1 + 2$ | $t_2 = t_1 + 2$ |
| $A[t_1] = t_2$ | $t_6 = t_2$ | $t_6 = t_2$ |
| $t_3 = 2 * t_2$ | $t_3 = 2 * t_2$ | $t_3 = 2 * t_2$ |
| $t_4 = A[t_1] * t_3$ | $t_4 = t_6 * t_3$ | $t_4 = t_6 * t_3$ |
| $t_5 = (A[t_1] * t_3) - (2*t_4)$ | $t_5 = (t_6 * t_3) - (2*t_4)$ | $t_5 = t_4 - (2*t_4)$ |
Figure 7
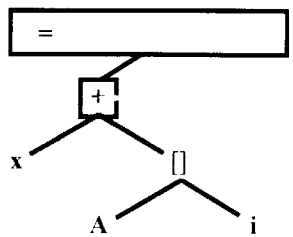
Figure 8A
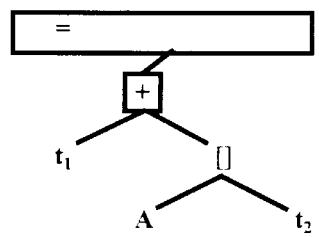
Figure 8B
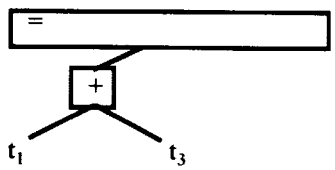
Figure 8C
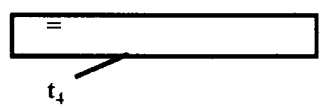
Figure 8D

METHOD FOR PERFORMING COMMON SUBEXPRESSION ELIMINATION ON A RACK-N STATIC SINGLE ASSIGNMENT LANGUAGE

BACKGROUND OF THE INVENTION

1. Field of the Invention

The invention relates to a computer implemented method for eliminating common subexpressions while constructing a static single assignment language representation of at least a portion of source code.

2. Related Applications

The invention disclosed and claimed herein is related to the following applications:

(1) my co-pending U.S. patent application Ser. No. 08/831,074, filed herewith, entitled "A Method for Constructing a Static Single Assignment Language Accommodating Arbitrarily Complex Symbolic Memory References" (Attorney Docket No. INPA:002|P3497);

(2) my co-pending U.S. patent application Ser. No. 08/831,739, filed herewith, entitled "A Method of Using Static Single Assignment to Color Out Artificial Register Dependencies" (Attorney Docket No. INPA:019|P3941);

(3) my co-pending U.S. patent application Ser. No. 08/829,847, filed herewith, entitled "A Method for Identifying Partial Redundancies in Existing Processor Architectures" (Attorney Docket No. INPA:014|P3936);

(4) my co-pending U.S. patent application Ser. No. 08/829,933, filed herewith, entitled "A Method for Identifying Partial Redundancies in a New Processor Architecture" (Attorney Docket No. INPA:021|P4306);

(5) my co-pending U.S. patent application Ser. No. 08/831,159, filed herewith, entitled "A Method for Determining the Set of Variables that May Be Ambiguously Defined at a Point in a Computer Program" (Attorney Docket No. INPA:015|P3947);

(6) my co-pending U.S. patent application Ser. No. 08/829,980, filed herewith, entitled "A Method for Optimizing a Loop in a Computer Program by Removing Loop-Invariant Loads Outside of a Loop" (Attorney Docket No. INPA:017|P3939);

All these applications are hereby expressly incorporated herein by reference for all permissible purposes as if expressly set forth vebatim herein.

3. Description of the Related Art

Most computer programmers write computer programs in source code using high-level languages such as C, FORTRAN, or PASCAL. While programmers may easily understand such languages, modem computers are not able to directly read such languages. Thus, such computer programs must be translated into a language, known as machine language, that a computer can read and execute. One step in the translating process is performed by a compiler. A compiler translates a source code program into object code. Object code is a machine language description of a source code program. Object code produced by conventional compiling techniques may often be made to execute faster. This improvement is called optimization. Compilers that apply code-improving transformations are called optimizing compilers.

Some conventional optimizing compilers translate high-level computer programs into an intermediate language known as a Static Single Assignment (SSA) representation. This SSA intermediate language is used as a basis to perform certain optimizations. After these optimizations are performed, these conventional compilers translate the SSA intermediate language into optimized object code. A deeper explanation of SSA intermediate languages follows and employs the terminology set forth immediately below.

A statement in a computer program is said to "define" a variable if it assigns, or may assign, a value to that variable. For example, the statement "x=y+z" is said to "define" x. A statement that defines a variable contains a "definition" of that variable. In this context, there are two types of variable definitions: unambiguous definitions and ambiguous definitions which may also be called complex definitions. Ambiguous definitions may also be called complex definitions.

When a definition consistently defines a particular variable, the definition is said to be an "unambiguous definition" of that variable. For example, the statement, "x=y" always assigns the value of y to x. Such a statement always defines the variable x with the value of y. Thus, the statement "x=y" is an "unambiguous definition" of x. If all definitions of a variable within particular segment of code are unambiguous definitions, then the variable is known as an unambiguous variable.

Some definitions do not consistently define the same variable. These definitions may possibly define different variables at different times in a computer program. Thus, they are called "ambiguous definitions." There are many types of ambiguous definitions and the principle common denominator among the many types is that they are not unambiguous definitions. One type of "ambiguous definition" occurs where a pointer refers to a variable. For example, the statement "*p=y" may be a definition of x since it is possible that the pointer p points to x. Thus, the definition may ambiguously define any variable x if it is possible that p points to x. In other words, *p may define one of several variables depending on the value of p. Another type of ambiguous definition is a call of a procedure with a variable passed by reference. When a variable is passed by reference, the address of the variable is passed to the procedure. Passing a variable by reference to a procedure allows the procedure to modify the variable. Still another type of ambiguous definition is a procedure that may access a variable because that variable is within the scope of the procedure. A further type of ambiguous definition occurs when a variable is not within the scope of a procedure, but the variable has been identified with another variable that is passed as a parameter or is within the scope of the procedure. Ambiguous definitions are known by those skilled in the art.

When a statement in a computer program references a variable, the statement is said to "use" the variable. For example, the statement "x=y+z" refers to and is said to "use" y and z. Similarly, y and z (but not x) are "used" in the statement "x[y]=z." A statement that uses a variable contains a "use" of that variable.

A definition of a variable "reaches" a use of that variable if that definition is the last definition of that variable prior to the use. Consider the following straight-line C pseudo code:

x=6
x=x+5
x=7
x=x+8

The definition in the first statement "x=6" reaches the use in the second statement "x=x+5." Similarly, the definition in the third statement "x=7" reaches the use in the fourth statement "x=x+8." Note that the definition in the first statement does not reach the use of the fourth statement because x is redefined in the second and third statements.

In the above example, the definitions of x in the second and third statements are said to "kill" the definition of x in the first statement in that they nullify the effects of the definition in the first statement. Only unambiguous definitions of a variable can kill other definitions of the variable. Thus, a use can be reached by both an unambiguous definition and a subsequent ambiguous definition of the same variable.

A computer programmer may address a variable by specifying the variable's location in memory. This location is known as the variable's absolute address. This method of addressing is known as direct addressing. Direct addressing commonly occurs when a variable is specified by its name. For example, in the statement "y=x," both y and x are directly addressed.

A computer programmer may also address a variable by specifying an address that refers to a different address, which may specify yet another address. This method of addressing is known as indirect addressing. Common examples of indirect addressing include pointers, arrays and combinations of pointers and arrays. Examples of indirect addressing include a[i], *p, *(p+4), **p, a[b[i]], and *(*p+4). When a variable is indirectly addressed, at least one indirect memory reference is employed to determine the absolute address of the variable.

A variable may be classified based upon the number of indirect memory references employed to determine the absolute address of the variable. For example, as discussed above, y and x may be directly addressed. Thus, there are zero indirect memory references employed to determine the absolute address of both y and x. These variables will be referred to as rank-0 variables.

A variable employing a single indirect memory reference will be referred to as a rank-1 variable. Examples of rank-1 variables include single pointer references and single array references such as a[i], *p, and *(p+4). A variable that requires two indirect memory references will be referred to as a rank-2 variable. Rank-2 variables include double pointer references and double array references and the combination of a single pointer reference and a single array reference. Examples of rank-2 variables include **p, a[b[i]], and *(*p+4). A rank-n variable employs n indirect memory references to determine the absolute address of the variable.

A definition that defines a rank-n variable will be referred to as a rank-n definition. Similarly a use of a rank-n variable will be referred to as a rank-n use. For example, the definition of the array element b[a[i]] is a rank-0 use of the variable i, a rank-1 use of the array element a[i], and a rank-2 definition of the array element b[a[i]].

Returning to the discussion of SSA intermediate languages, when a computer program is conventionally translated into a SSA intermediate language, each variable definition is given a unique name. Further, all the uses reached by that definition are also renamed to match the variable's new name. For example, consider the straight-line C pseudo code discussed above. When this C pseudo code is translated into a SSA intermediate language, the result would be the following:

$t_1 = 6$
$t_2 = t_1 + 5$
$t_3 = 7$
$t_4 = t_3 + 8$

The symbols $t_1$ through $t_4$ represent compiler temporaries. Compiler temporaries are also known by those skilled in the art as temps. Unlike most variables, temps have only a single definition. Because a temp has only a single definition, it may not be defined by an ambiguous definition. Thus, temps are unaliasable scalars. Because temps are unaliasable scalars, an expression using $t_1$ has a different symbolic meaning from the symbolic meaning of an otherwise identical expression using i. Every use of i cannot be considered equal because i represents an aliasable variable. However, every use of $t_1$ can be considered equal. While a compiler may not be able to determine the value contained in a temp, every use of that temp will return the same unknown value. Therefore, temps dramatically simplify certain compiler techniques.

Unlike the above straight-line C pseudo code, programs typically also contain branch statements. A branch statement is a statement that selects one set of statements from a number of alternative sets of statements. For example, consider the following if-then-else statement:

if $(p)$ then $\{x = 4\}$ else $\{x = 6\}$ $x = 2 + x$

The flow of control through this code segment during execution will branch depending on whether p is true or false and will unite again at the statement "x=z*x." The point where the flow of control branches is known as the branch point and the point where it unites is known as the "join points" or the "confluence point."

When this C pseudo code is translated into a SSA intermediate language, the result would be the following:

if $(p)$ then $\{t_1 = 4\}$ else $\{t_2 = 6\}$ $t_3 = \Phi(t_1, t_2)$ $t_4 = 2 + t_3$ Depending on the value of p, either $t_1$ will be defined as 4 or $t_2$ will be defined as 6. In order to "join" these two definitions, a special definition called a phi-function is inserted at the point where the branches join. A phi-function, which is known in the art, is a function that makes explicit a confluence point for multiple definitions that reach a particular point in a computer program.

The above phi-function contains two operands. An operand is a quantity that enters into (or results from) an operation. The operands indicate which definitions reach the join point. In this example, both $t_1$ and $t_2$ reach the join point. Thus, both $t_1$ and $t_2$ are operands to the phi-function that defines $t_3$. As shown above, subsequent uses of x in the original program would use $t_3$ in the corresponding SSA intermediate language.

Conventional SSA intermediate languages accommodate only rank-0 variables. Ambiguous definitions and uses reached by ambiguous definitions cannot be renamed as temps. Phi-nodes also cannot be inserted in conventional SSA intermediate languages without temps. Therefore, phi-nodes cannot conventionally be inserted in the presence of ambiguity interjected by ambiguous definitions and their uses. Thus, rank-1 and rank-2 variables are not included in conventional SSA intermediate languages. Because such intermediate languages contain only a limited amount of symbolic information, only limited optimizations may be based on such languages. Thus, in order to perform significant optimizations, numerous ad hoc techniques are employed. These conventional techniques are inefficient, incomplete, not well defined, and complex.

One common type of optimization is known as common subexpression elimination ("CSE"). A common subexpression is a subexpression within an expression that was previously computed and whose variables have not changed since the previous computation. For instance, consider the following code segment:

a=x+y
b=x+y+z

The first statement, or expression, defines the variable a using the subexpression x+y. The second statement, or expression, defines the variable b using the subexpression x+y+z. Both the first and second expressions use the common subexpression x+y to define their respective variables. Each time the subexpression "x+y" is used, the values assigned the variables x and y must be loaded. Thus, if the subexpression can be eliminated by replacing it with a single variable, requiring only a single load, execution time can be reduced. The cumulative effect of eliminating numerous common subexpressions can sometimes significantly reduce execution time.

However, current CSE techniques are part of the ad hoc and inefficient optimization process set forth above. In some cases, the inefficiencies offset the benefits of performing CSE. Current techniques also are not applicable to ran −1 and higher variables. Thus, there is a need for a more efficient CSE technique and a CSE technique that can be applied to rank-1 and higher variables.

SUMMARY OF THE INVENTION

Briefly, in one embodiment, the invention is a method for eliminating common subexpressions in an initial SSA intermediate language representation of at least a portion of a computer program. The method includes (a) inserting a phi-node for an unambiguous definition used in an unambiguous subexpression reaching a join point in the initial intermediate language subsequent to the join point; (b) inserting a phi-node for the unambiguous common subexpression; (c) renaming the unambiguous definition and a subsequent use reached by the definition; and (d) renaming the unambiguous common subexpression.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings:

FIGS. 4A–4D are tables illustrating code transformations on a sample code segment resulting from the renaming of definitions, uses, and expressions in accord with an embodiment of the present invention;

FIG. 7 is a table illustrating the code transformations on the code segment in FIG. 4A after the embodiment of FIG. 6A is performed thereon to generate a rank-1 SSA intermediate language representation thereof, FIGS. 8A–8D are diagrams illustrating an expression tree for a sample expression and the effect of renaming in accordance with the embodiment of FIG. 6B;

DETAILED DESCRIPTION OF PARTICULAR EMBODIMENTS

Numerous specific details are set forth below in the detailed description of particular embodiments in order to provide a thorough understanding of the present invention. However, one of ordinary skill in the art having the benefit of this disclosure will understand that the present invention may be practiced without many of the details presented since such details will be necessary or useful depending on the particular embodiment being employed. Conversely, in other instances, well known details have not been described in detail for the sake of clarity so as not to obscure the invention. It will be appreciated that supplying such details would be a routine undertaking for those of ordinary skill in the art, even if a complex and time-consuming task, given the benefit of this disclosure.

Figure 1:
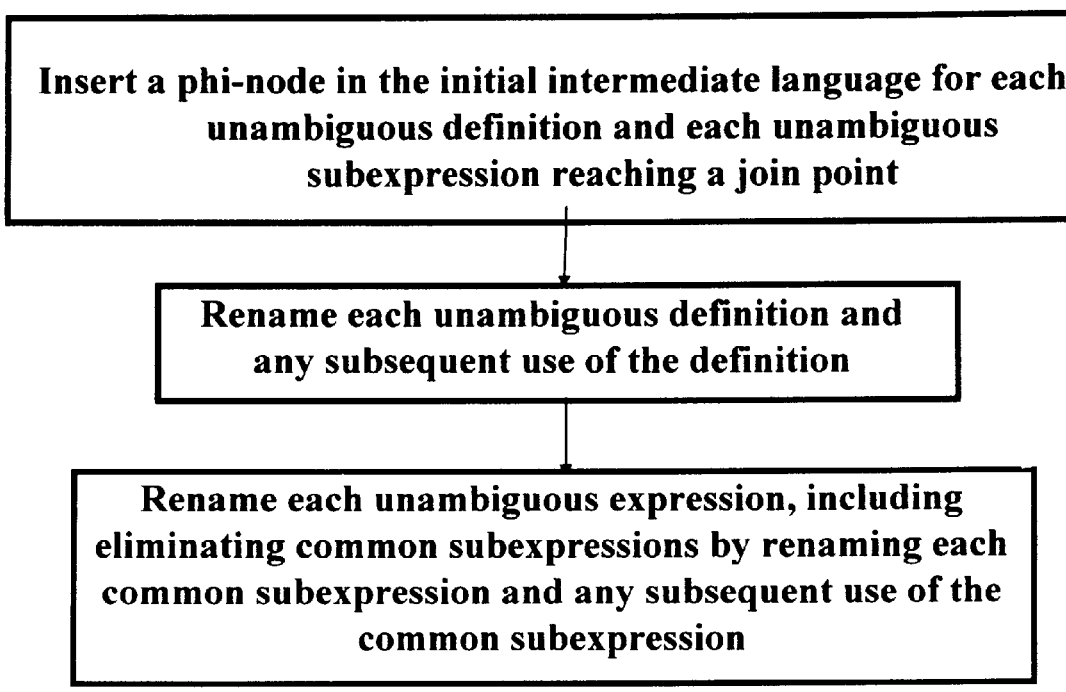
FIG. 1 is a flow chart illustrating an embodiment of the present invention.

One embodiment for eliminating common subexpressions using an SSA intermediate language representation in accordance with the present invention is illustrated in FIG. 1. As shown in FIG. 1, the method comprises inserting phi-nodes in the initial intermediate language representation, renaming each unambiguous definition and each subsequent use of that definition in the initial intermediate language representation, and renaming expressions in the initial intermediate language representation. Each of these phases is set forth in more detail below. To facilitate the disclosure of the several embodiments of the present invention herein and more clearly demonstrate the involved concepts, the discussion below is set in the context of the overall compilation process illustrated in FIG. 2. However, it is to be understood that the invention is not to be so limited and that the invention for which protection is sought is as described in the claims hereof.

Figure 2:
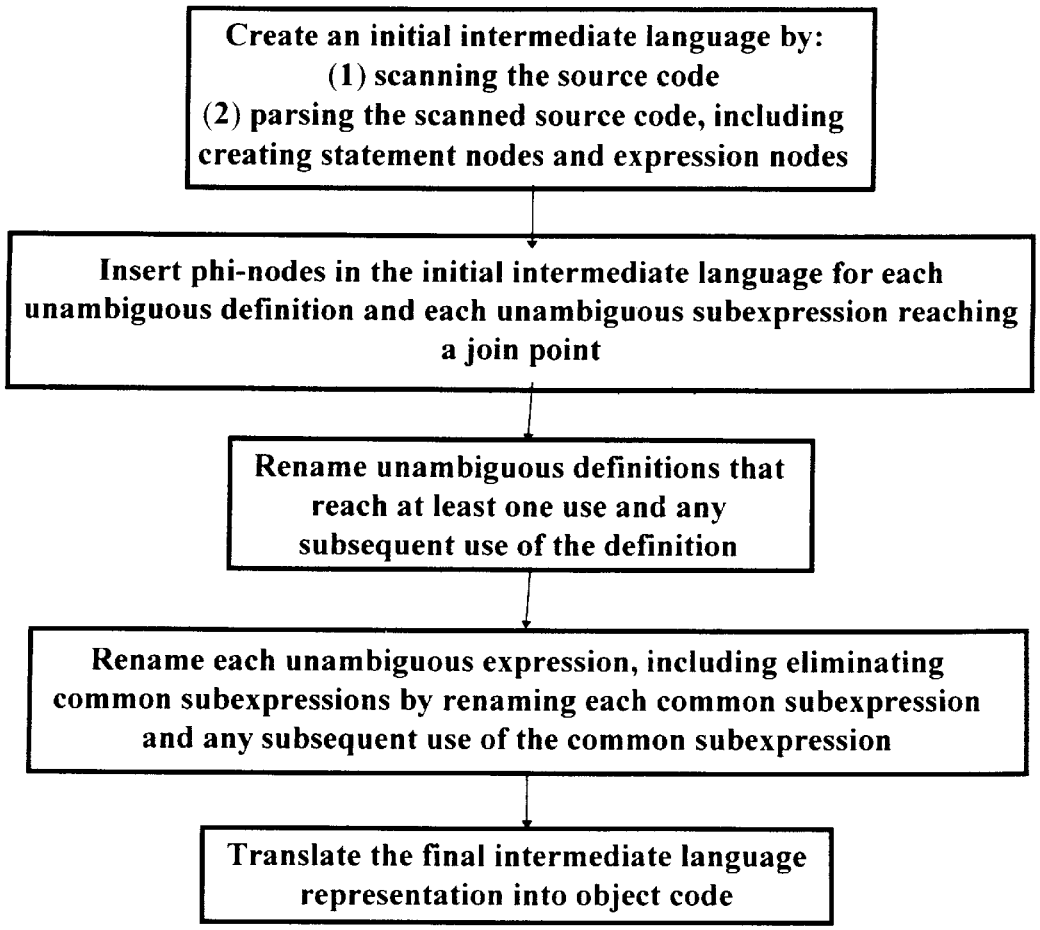
FIG. 2 is a flowchart illustrating one particular embodiment in accordance with the present invention employed in the compilation of at least a portion of source code.

Referring now to FIG. 2, the compiler in this particular embodiment first creates an initial intermediate language representation of at least a portion of source code. The portion of source code typically includes several statements that may be characterized of as streams of characters. Creating initial intermediate language representations is well known in the art. Typically, this creation involves scanning the source code, which produces a plurality of tokens, and then parsing the resulting tokens, all as discussed more fully below. In the particular embodiment of FIG. 2, parsing involves creating statement nodes and expression nodes.

The compiler first scans the source code. More technically, the compiler first performs a linear analysis, often called "scanning" or "lexical analysis," on a source computer program. The source computer program typically will be in a high-level language however, it may also be stored in a lower-level language. Scanning is well known by those skilled in the art. The stream of characters in the source computer program is typically read from left to right. When the stream of characters is scanned, the characters are grouped into sequences of characters having a collective meaning. These sequences of characters are known as tokens. The character stream "area=2*pi*" could be grouped into the following tokens:

(1) the identifier area;
(2) the assignment symbol =;
(3) the number 2;
(4) the multiplication sign;
(5) the identifier pi;
(6) the multiplication sign; and
(7) the identifier r.

Scanning the source computer program results in a plurality of tokens. The blanks between the tokens are typically eliminated.

Referring again to FIG. 2, the compiler then parses the scanned source code. After scanning the source computer program, the plurality of tokens are grouped into a hierarchical structure that will be referred to as an intermediate language. A hierarchical structure is a structure having several levels arranged in a tree-like structure. This grouping of the tokens is known by those skilled in the art as parsing. Common parsing methods include top-down and bottom-up methods. The intermediate language may be represented by a parse tree, although it is not necessary to construct a formal parse tree. All that is needed is a data structure containing the relationship between the tokens.

In one embodiment there may be two major types of nodes in the intermediate language: statement nodes and expression nodes. The particular types of nodes used in the intermediate language is immaterial. All that is necessary is that the statements and expressions in the source computer program be properly related in a data structure.

Statement nodes represent program constructs that contain program flow information. A program construct is a statement or a part of a statement in a computer language. Common program constructs include: assign, if, while, goto, switch, repeat, call, and return. Typically, a field in a statement node includes a pointer to one or more other statements nodes. For example, a field in a statement node that represents the assign program construct may point to a previous statement node and another field may point to a subsequent statement node. A statement node that represents the assign program construct typically contains one definition and possibly one or more uses.

Statement nodes may represent conditional constructs. A conditional construct is a statement or part of a statement that specifies several different execution sequences. Examples of conditional constructs include: if, while, goto, switch, repeat, call, and return. Statement nodes that represent conditional constructs include control flow information. For example, a statement node that represents the "if" conditional construct may contain two additional pointers. The first pointer would point to a statement node that is to be executed if a given expression is true. The second pointer would point to a statement node that is to be executed if the given expression is false. A statement node that represents an if-then-else conditional program construct may include the following information:

(1) Number: A unique integer that allows reference to a particular statement node via an integer index.
(2) Predecessor: A pointer to a previous statement node. This pointer allows the statement nodes to be efficiently stored in a doubly linked list.
(3) Successor: A pointer to a subsequent statement node.
(4) SATT: A bitset of statement node attributes. Possible attributes of a statement node include processed, optimized, and unreachable.
(5) DBG-node: A field that allows attachment of debugger annotations.
(6) Bblock: The basic block that contains the statement.
(7) Ins: The uses of the expression.
(8) Outs: The definitions of the expression.
(9) If-expr: The expression that is to be evaluated by an if statement. This expression predicates whether the true side or the false side is to be taken.
(10) If-true: The first statement to be executed if the if-expr is true.
(11) If-false: The first statement to be executed if the if-expr is false.

However, this list is neither exclusive nor exhaustive as one of ordinary skill in the art having the benefits of this disclosure will appreciate.

Expression nodes represent expressions. An expression is a program construct for computing a value from one or more operands such as constants, variables, temps, and/or pointers. An expression may include as a group of constants or variables separated by operators that yield a single value. Common operators include: add, subtract, multiply, divide, shift left, shift right, and convert. An expression may be arithmetic, relational, logical, or even a character string. An individual expression node may represent an operation, a scalar variable, an array variable, a constant, a temp, or a memory reference. A scalar variable is a variable that represents a single data item. A scalar variable may be contrasted with an array variable that represents many data items.

Expression nodes that represent operations may contain two fields that point to other expression nodes. One of the fields may point to another expression node that represents another operation. The second field may point to an expression node that represents a constant, a variable, or a temp. For example, the expression "a+b+4+$t_5$" may be represented by the following grouping of expression nodes:

```
    +
   / \
  t5  +
```

```
      /  \
    4     +
         / \
        a   b
```

This type of representation may be referred to as an expression or, as the case may be, subexpression, tree. Expression trees comprised of expression nodes depend from statement nodes. The expression "A[i][j]" may be may be represented by the following grouping of expression nodes:

```
        []
       /  \
      []   j
     /  \
    A    i
```

An expression node for an operation such as "addition" may include the following information:
(1) Number: A unique integer that allows reference to a particular expression via an integer index.
(2) OP: A word indicating the operation of the expression node.
(3) Succ-cnt: The number of operands in the expression tree of the expression node. (The number of operands varies depending upon the operation.)
(4) N-words: pointers to the operands in the expression tree.

However, this list is neither exclusive nor exhaustive as one of ordinary skill in the art having the benefits of this disclosure will appreciate.

Expression nodes are typically used as operands for statement nodes. For example, consider the following if-then-else statement.

```
if (x = 5) then
    {x = 4}
else
    {x = 6}
x = 2 + x
```

Figure 3:
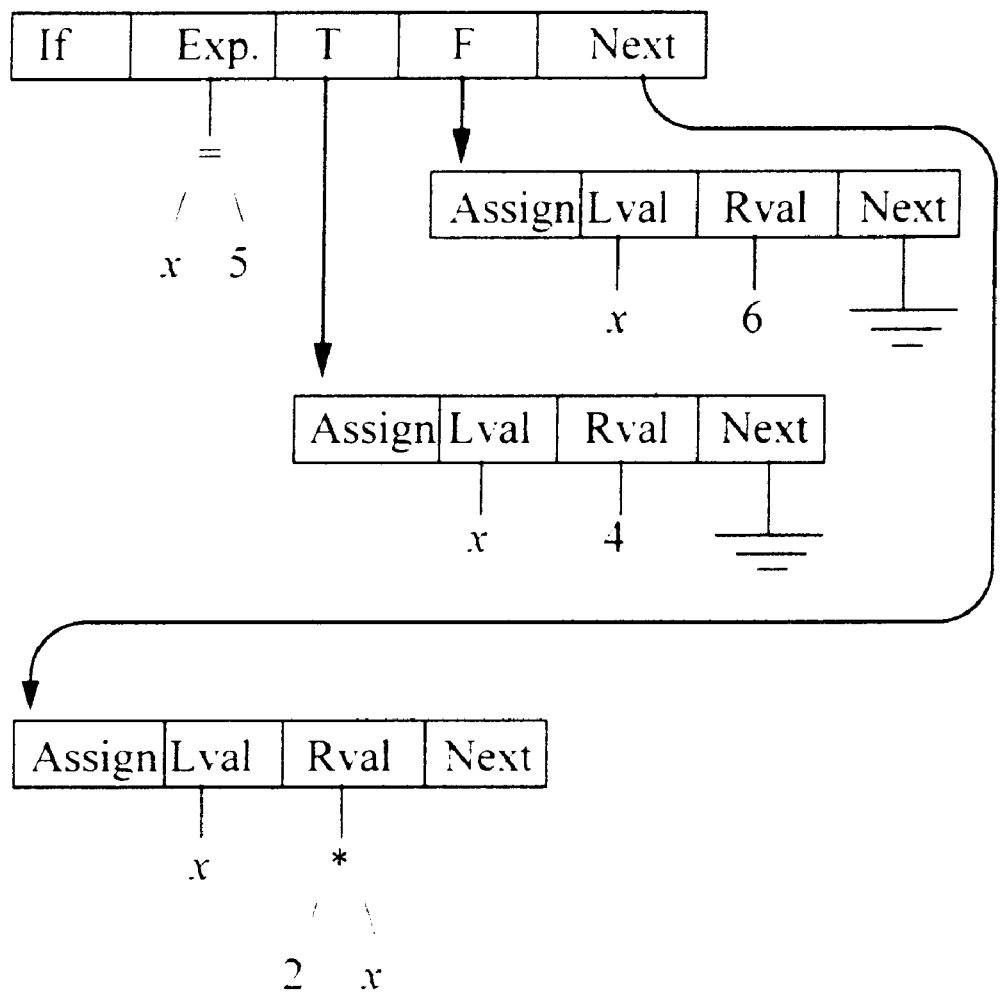
FIG. 3 is a diagram illustrating an intermediate language representation of an if-then-else statement.

This statement may be represented by the group of nodes shown in FIG. 3.

Referring again to FIG. 2, the tokens are parsed into nodes. If a token represents a program construct, then a statement node is created in the intermediate language that represents the program construct. This statement node typically includes program flow information and possibly control flow information. If a token represents an expression, then an expression node is created in the intermediate language that represents the expression. Typically, these expression nodes are operands to statement nodes.

Scanning and parsing the source code generates an initial intermediate language representation of the source code. Once the initial intermediate language representation is created, then a rank-0 SSA intermediate language is created. This is generally done by, as illustrated in FIG. 1, inserting phi-nodes; renaming each unambiguous definition and each subsequent use reached by the definition; and when performed in accordance with the present invention, renaming expressions while eliminating common subexpressions. Each of these phases is discussed in turn below within the context of the overall compilation process as shown in FIG. 2.

Phi-node insertion begins with a search through the intermediate language representation for join points. A special statement node, known as a phi-node, is typically inserted at certain join points. A phi-node may include the following information:
(1) Number: A unique integer that allow reference to a particular phi-node via an integer index.
(2) Predecessor: A pointer to a previous phi-node. This pointer allows the phi-nodes to be efficiently stored in a doubly linked list.
(3) Successor: A pointer to a subsequent phi-node.
(4) SATT: A bitset of phi-node attributes. Possible attributes of a phi-node include processed, optimized, and unreachable.
(5) DBG-node: A field that allows attachment of debugger annotations.
(6) Bblock: The basic block that contains the phi-node.
(7) Ins: The uses of the phi-node.
(8) Lval: The variable definition
(9) Defs: The operand list of the phi-node.

However, this list is neither exclusive nor exhaustive as one of ordinary skill in the art having the benefits of this disclosure will appreciate.

Proper placement of phi-nodes may reduce the compiler execution time and may also reduce the execution time of the computer program. It is conservative, ie., safe, but inefficient to place phi-nodes at every join point in the SSA intermediate language. An improved method may be placing a phi-node immediately preceding all statement nodes containing a use that has multiple reaching definitions. Such uses may be located by performing a depth-first search of the rank-0 SSA intermediate language. Techniques for placing phi-nodes are known in the art. Two such techniques are shown in Ron Cytron et al., *Efficiently Computing Static Single Assignment Form and the Control Dependence Graph,* ACM Transactions on Programming Languages and Systems, Vol. 13, No. 4, October 1991 and Vugranam C. Sreedhar, *Efficient Program Analysis Using DJ Graphs,* Ph.D. Thesis, School of Computer Science, McGill Univ., Quebec, Canada, 1995, both of which are hereby expressly incorporated by reference.

Any such phi-node placement technique known to the art as suitable for this purpose may be used. One technique used in one particular embodiment of the present invention is disclosed and claimed in my co-pending applications Ser. No. 08/829,847, entitled "A Method for Identifying and Eliminating Partial Redundancies in Existing Processor Architectures," and Ser. No. 08/829,933, filed herewith, entitled "A Method for Identifying and Eliminating Partial Redundancies in a New Processor Architecture." Both of these applications were incorporated by reference above.

More precisely, a phi-node is inserted immediately subsequent to each join point for each definition and subexpression that reaches that join point. Phi-node insertion may be performed in a single pass through the initial intermediate language representation or may be separated into several passes. In some embodiments, phi-nodes may be inserted only for unambiguous definitions and unambiguous subexpressions. In other embodiments, phi-nodes may be inserted without regard to the presence of ambiguity, particularly in embodiments utilizing rank-n SSA intermediate language representations as discussed below. The choice among these phi-node insertion techniques will be determined by the specific implementation of the present invention.

Referring again to FIG. 2, the compiler next renames each unambiguous, ie., rank-0, definition and any subsequent use it reaches in the initial intermediate language representation. The compiler searches the intermediate language for any statement nodes containing a rank-0 definition of a variable that reaches a statement node containing a rank-0 use of that variable. A depth-first search of the intermediate language may be preferred because it provides an efficient searching method. A depth-first search is a search of a hierarchical data structure that first chooses one of the possible branches of a search tree, proceeds along the chosen branch until the goal or a predetermined depth is reached, and if the goal has not been reached, goes back to the starting point and chooses another branch. Depth-first searches of hierarchical data structures are known by those skilled in the art. If a statement node that contains a rank-0 definition that reaches a statement node containing a rank-0 use is found during the depth-first search, then the rank-0 definition and the rank-0 use are renamed with a temp.

Consider the initial intermediate language representation of a source computer program shown in the first column of FIG. 4A. This series includes a rank-0 definition of the variable i that reaches five rank-0 uses of i. Thus, as shown in the second column of FIG. 4A, when the rank-0 SSA intermediate language is created, i will be renamed to $t_1$ in the rank-0 definition and the five rank-0 uses. This renaming may occur because each of the five uses of i in the intermediate language will return the same value when the computer program is executed. Similarly, the definitions of a, b, and c are also renamed along with their uses. Variable renaming in the course of constructing rank-0 SSA intermediate language representations is well known in the art.

The compiler then renames common subexpressions, thereby eliminating common subexpressions. In the process of renaming uses, the compiler determines whether a use of a variable is symbolically equivalent to a preceding, renamed definition. This determination is performed on expression trees to determine whether any subexpressions are symbolically equivalent to any previously renamed definition. If so, the subexpression is renamed just as any use of the renamed definition. The example of FIG. 4A contains only a single unambiguous common subexpression, that being i+2. Thus, as seen in the third column of FIG. 4A, the common subexpression is renamed in the fourth statement to $t_2$.

More particularly, in the first column of FIG. 4A, the variable a is defined using the subexpression i+2 and the subsequent definition of b uses the common subexpression i+2. The variable a is renamed $t_2$, as is the use of a in the definition of b and throughout the remainder of the intermediate language representation as shown in the second column. This process continues until all unambiguous definitions have been renamed. The compiler then continues by renaming common subexpressions. When the compiler reaches the definition of b, now renamed $t_3$, it determines that the subexpression $t_1+2$ is symbolically equivalent to the expression $t_2$, and the common subexpression is renamed $t_2$. In this manner, the common subexpression is eliminated and the resulting code transformations are illustrated in the third column of FIG. 4A.

One particular embodiment of the invention employs the technique illustrated in FIGS. 5A–5D. Consider the following code segment:

$$x = 1$$
$$y = 2$$
$$z = 3$$
$$a = x + y$$
$$b = y + z$$
$$c = x + y + z$$
$$d = x + y + z + 1$$

Figure 5A:
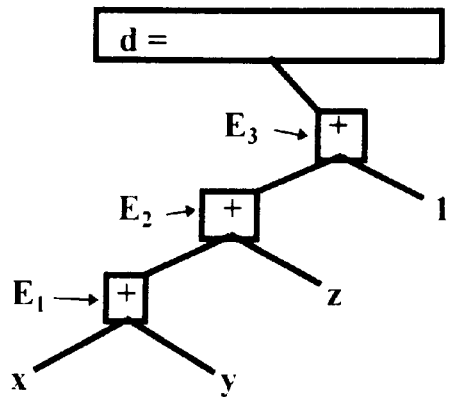
FIGS. 5A–5C are diagrams illustrating an expression tree for a sample expression and the effect of renaming in accord with the embodiment of FIG. 1.

The expressions comprising this code segment contain multiple common subexpressions, and FIG. 5A represents an expression tree for the last statement. Each of the expressions may correspond to a respective expression tree as well, but only the one is shown for the sake of clarity.

Upon creating the expression tree, the compiler sets up two lists, one of the terminal nodes and one of the interior nodes. The terminal nodes of the tree in FIG. 5A are x, y, z, and 1, and such terminal nodes are sometimes called the leaves of the expression tree. The interior nodes in FIG. 5A are those containing the "+", or addition, operands. The compiler first traverses the list of the leaves of the trees, renaming where possible, such that the terminals are visited from the bottom up or in a depth-first ordered traversal. The code segment then looks like:

$t_1=1$
$t_2=2$
$t_3=3$
$t_4=t_1+t_2$
$t_5=t_2+t_3$
$t_6=t_1+t_2+t_3$
$t_7=t_1+t_2+t_3+1$

Figure 5B:
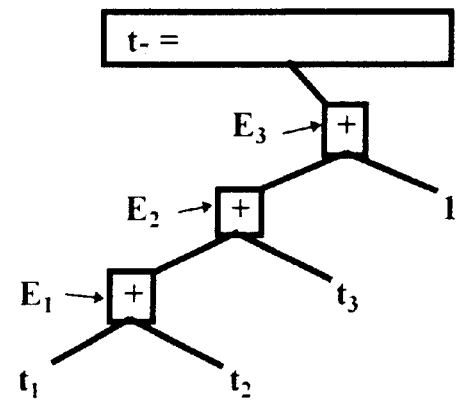

The resulting expression tree is illustrated in FIG. 5B.

Next, the compiler traverses the list of interior nodes, renaming where possible, such that the interiors are visited from the bottom up or in a depth ordered traversal. The code then looks like:

$t_1=1$
$t_2=2$
$t_3=3$
$t_4=t_1+t_2$
$t_5=t_2+t_3$
$t_6=t_4+t_3$
$t_7=t_6+1$

Figure 5C:
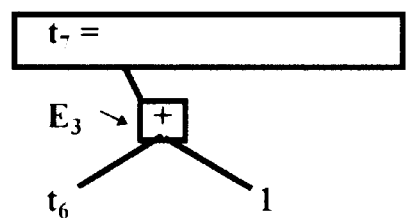

The resulting expression tree is illustrated in FIG. 5C, which graphically illustrates the simplification arising from the elimination of common subexpressions. The technique described above relative to FIGS. 5A–5C may also be used to implement the code transformations illustrated in FIG. 4A. While it may be useful to construct an expression tree, it is not necessary to build a formal expression tree.

Figure 10A:
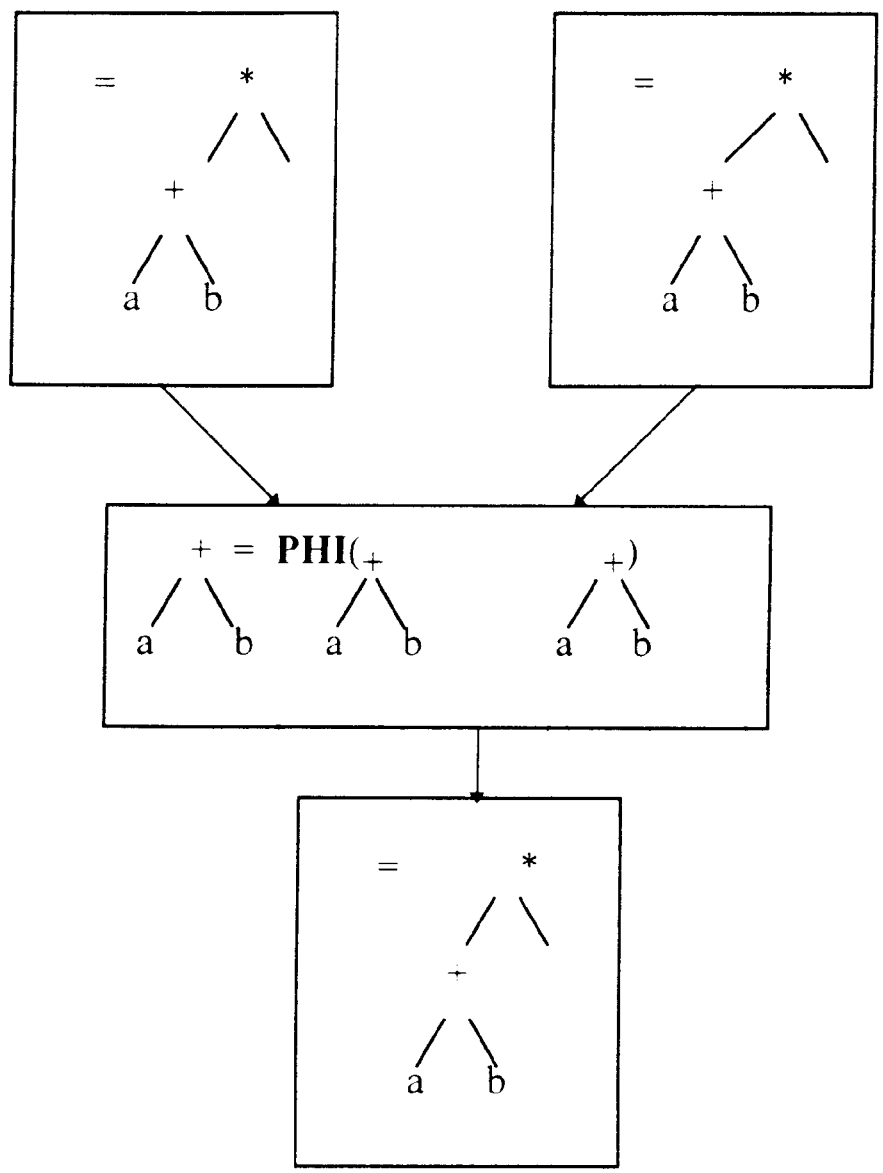
FIGS. 10A and 10B graphically illustrate the common subexpression elimination technique on a flow control graph for a sample code segment.
Figure 10B:
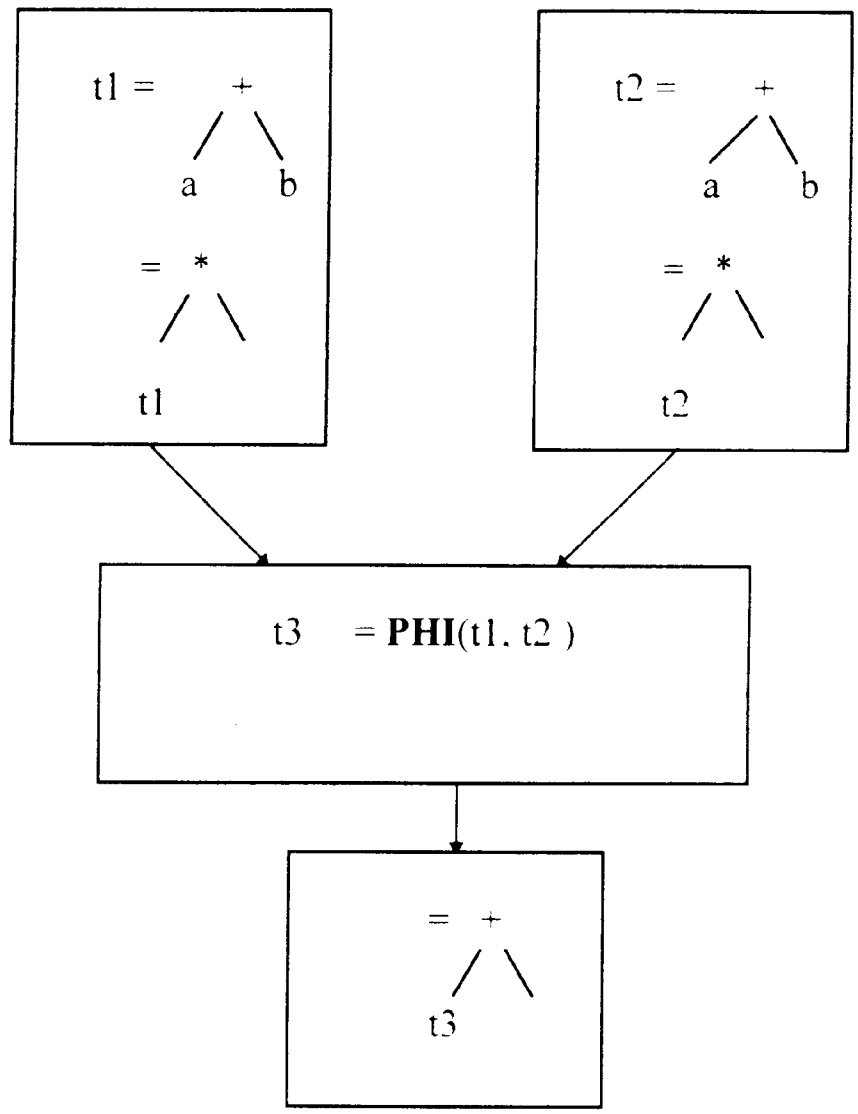

Another example is illustrated in FIGS. 10A and 10B. FIG. 10A depicts a flow graph for a code segment containing the common subexpression a+b that reaches the join point. Note that a phi-node has been inserted for the common subexpression immediately subsequent to the joint point. Note also that the common subexpression is unambiguous. During the renaming phase, the subexpression is renamed to a compiler temporary, thus eliminating the common subexpression as shown in FIG. 10B.

Many alternative embodiments for eliminating common subexpressions in a rank-n SSS intermediate language may be implemented. The renaming of common subexpressions can be performed in the course of a depth-first ordered traversal and can be performed in the same pass as the renaming of definitions in some embodiments. The first and second columns of FIG. 4C show the resulting code transformations from such an embodiment. Furthermore, the invention can be employed with the "advanced load" feature employed in eliminating loop invariant motion in my co-pending patent application Ser. No. 08/829,980 entitled "A Method for Optimizing a Loop in a Computer Program by Removing Loop-Invariant Loads Outside of a Loop" and in eliminating partial redundancies in my co-pending patent applications Ser. No. 08/829,847 entitled "A Method for Identifying and Eliminating Partial Redundancies in Existing Processor Architectures" and Ser. No. 08/829,933 entitled "A Method for Identifying and Eliminating Partial Redundancies in a New Processor Architecture." The resulting code transformations are shown in FIG. 4D.

Referring now to FIG. 2, once the SSA intermediate language representation is completed, it may be translated into object code or optionally into machine language. This translation enables a computer to directly execute the computer program. This translation is well known to those in the art and any translator known to the art to be suitable for this purpose may be used.

Figure 6A:
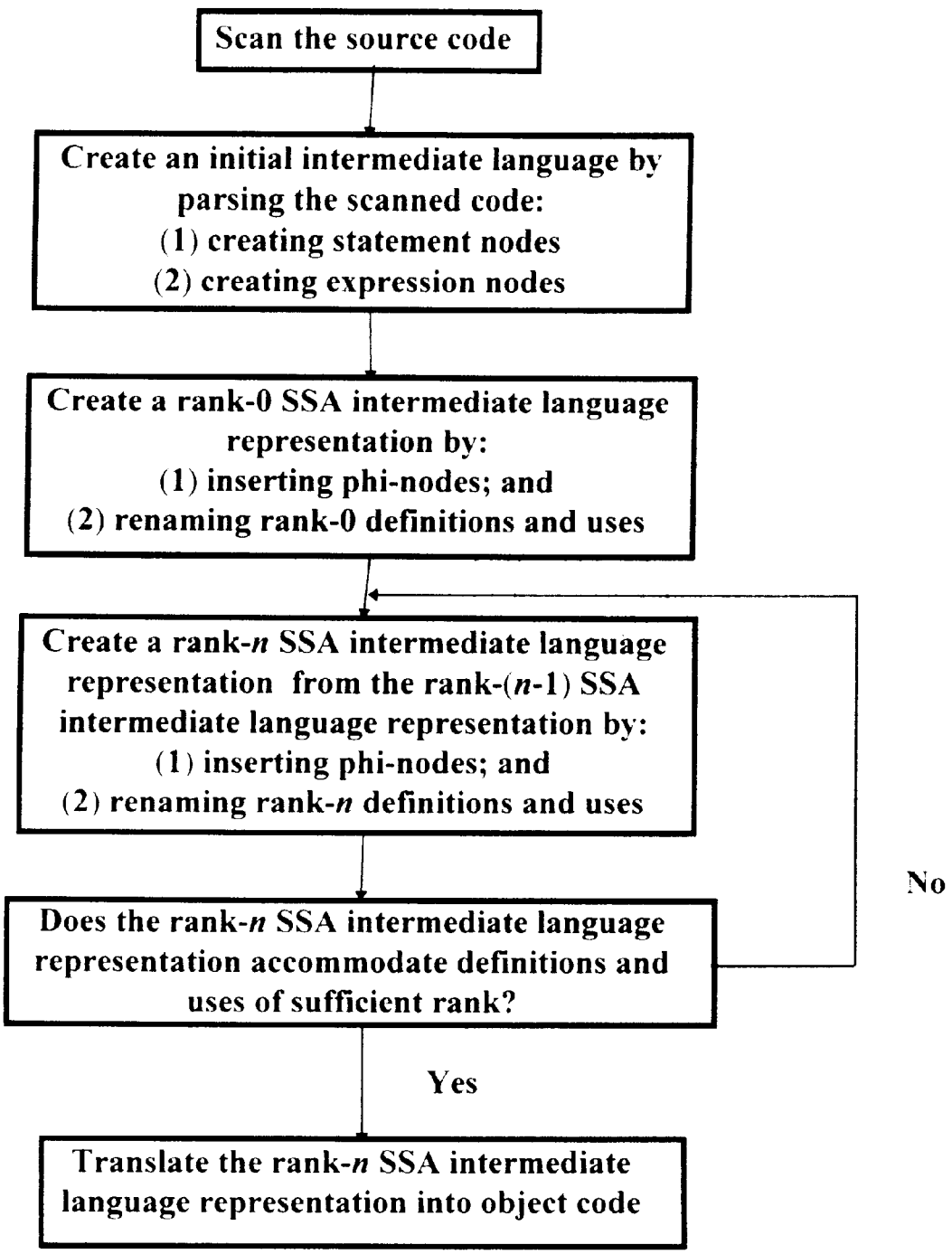
FIG. 6A is a flowchart illustrating one embodiment of a method for creating a rank-n single assignment intermediate language representation of at least a portion of source code in accord with the invention disclosed and claimed in my co-pending application Ser. No. 08/831,074, entitled "A Method for Constructing a Static Single Assignment Language Accommodating Arbitrarily Complex Symbolic Memory References," and previously incorporated by reference.

One embodiment of the invention iterates the general method of FIG. 1 until a rank-n SSA intermediate language representation is created. The general method for generating a rank-n SSA intermediate language representation is disclosed and claimed in my co-pending U.S. patent application Ser. No. 08/831,074, filed herewith, entitled "A Method for Constructing a Static Single Assignment Language Accommodating Arbitrarily Complex Symbolic Memory References," previously incorporated by reference. The general method as disclosed therein is illustrated in FIG. 6A, which depicts how a rank-1 SSA intermediate language representation may be created from the rank-0 SSA intermediate language.

As discussed above, the rank-0 SSA intermediate language accommodates only rank-0 definitions and rank-0 uses. Rank-1 and higher rank definitions and uses are not accommodated. Rank-1 definitions and rank-1 uses may be accommodated by renaming all rank-1 definitions in the rank-0 SSA intermediate language representation that reach a use. Generally, any rank-(n−1) SSA intermediate language representation may be translated into a rank-n SSA intermediate language representation, by renaming all rank-1 definitions in the rank-(n−1) SSA intermediate language that reach a use.

Figure 6B:
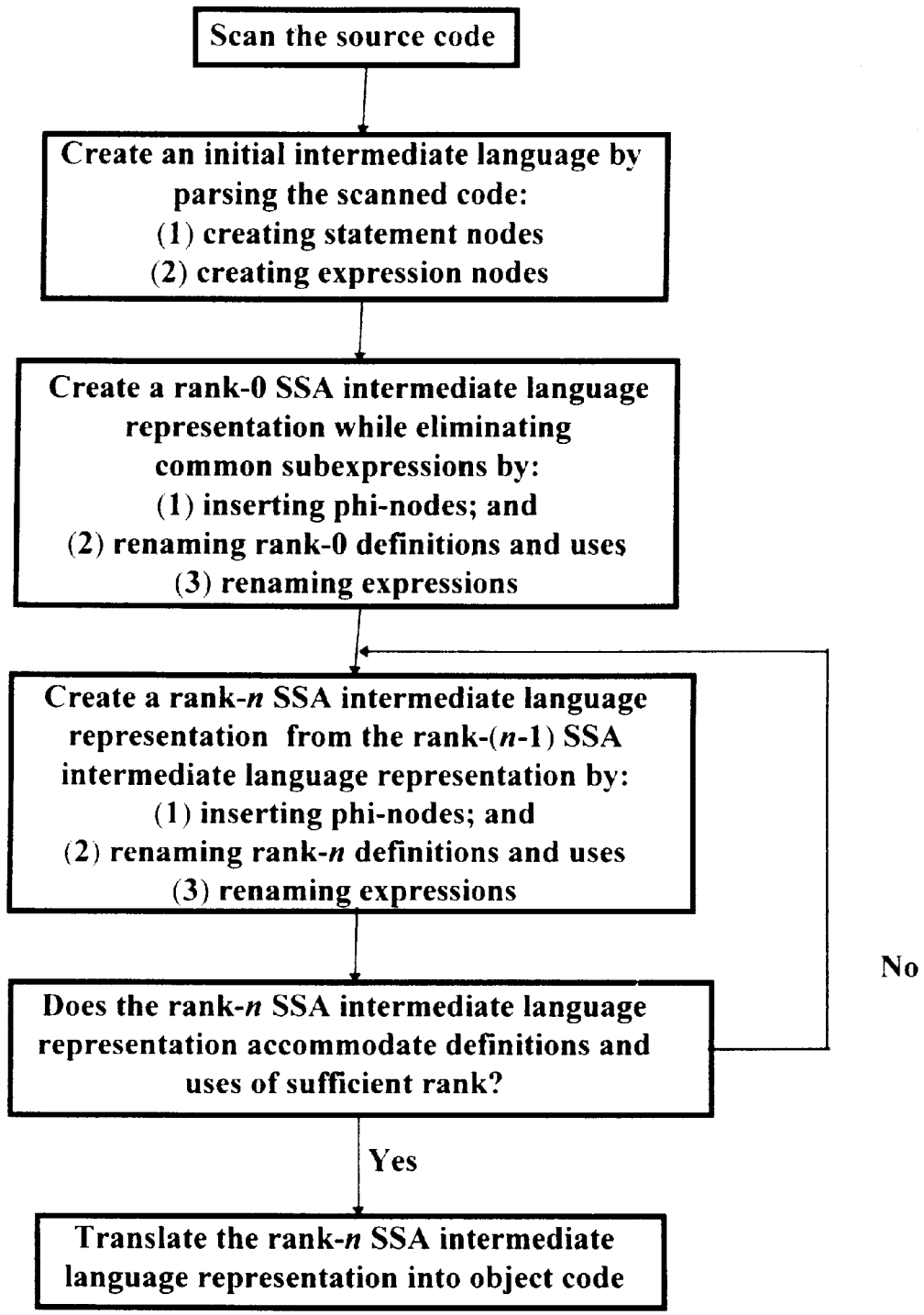
FIG. 6B is a flowchart illustrating one embodiment of the present invention incorporating the embodiment of FIG. 6A.

The incorporation of an embodiment of rank-n SSA intermediate language generation into an embodiment in accordance with the present invention is depicted in FIG. 6B. Consider again the series of computer program statements in the rank-0 SSA intermediate language shown in FIG. 4A. The final column of FIG. 4A illustrates the rank-0 SSA intermediate language representation after CSE and is reproduced in the first column of FIG. 7. The series contains a rank-1 definition and two rank-1 uses of the array element A[i], which is renamed in FIG. 4A to A[$t_1$]. This definition is no longer ambiguous once it has been renamed in the course of generating the rank-0 SSA intermediate language representation.

Thus, as shown in the second column of FIG. 7, when rank-1 definitions and uses are renamed, A[$t_1$] is renamed to $t_6$ as are the two rank-1 uses. This renaming may be performed because both uses of A[$t_1$] are no longer ambiguous and will return the same value when the computer program is executed. As is apparent even in the first column of FIG. 4A, the final two statements contain the common subexpression A[i]*b. Now that A[i] has been renamed and all terminals in the final statement have been renamed, the common subexpression can be eliminated by renaming $t_6*t_3$ in the final statement to $t_4$. Thus, the third column of FIG. 7 depicts the rank-1 SSA intermediate language representation of the code illustrated in the first column of FIG. 4A when rank-n generation is incorporated into an embodiment in accordance with the present invention.

The effect of this process on the expression tree of a rank-1 expression is illustrated in FIGS. 8A–8D, assuming a previous unambiguous use of the variable x, the variable i, and the expression x+A[i]. The initial expression tree is illustrated in FIG. 8A, and FIG. 8B shows the effect of renaming the uses of x and i. Thus, FIG. 8B illustrates the rank-0 expression tree. FIG. 8C illustrates the renaming of the variable A[$t_2$] and FIG. 8D illustrates the renaming of the subexpression $t_1+t_3$, which is the subexpression x+A[i] after rank-1 renaming. Thus, FIG. 8D illustrates the rank-1 expression tree.

The above renaming process may be repeated until a SSA intermediate language is created that accommodates definitions and uses of a sufficient rank as is illustrated in FIG. 6B. After the rank-n SSA intermediate language is created, it may be translated into object code or optionally into machine language. This translation enables a computer to directly execute the computer program. This translation is well known to those in the art and any translator known to the art to be suitable for this purpose may be used.

Still other alternative embodiments are possible and may even be desirable. Ambiguous constant propagation is disclosed and claimed in my co-pending United States patent application Ser. No. 08/831,159, filed herewith, entitled "A Method for Determining the Set of Variables that May Be Ambiguously Defined at a Point in a Computer Program." Alternative embodiments may also include, for instance:

(1) identifying and eliminating partial redundancies while constructing the final intermediate language representation such as, for example, is set forth in my co-pending U.S. patent application Ser. No. 08/829,847 entitled "A Method for Identifying Partial Redundancies in Existing Processor Architectures" and in my co-pending U.S. patent application Ser. No. 08/829,933 entitled "A Method for Identifying Partial Redundancies in a New Processor Architecture;"

(2) coloring out artificial register dependencies such as, for example, is set forth in my co-pending U.S. patent application Ser. No. 08/831,739, filed herewith, entitled "A Method of Using Static Single Assignment to Color Out Artificial Register Dependencies;" and (3) eliminating loop invariant motion such as, for example, is set forth in my co-pending U.S. patent application Ser. No. 08/829,920, filed herewith, entitled "A Method for Optimizing a Loop in a Computer Program by Removing Loop-Invariant Loads Outside of a Loop."

Figure 9:
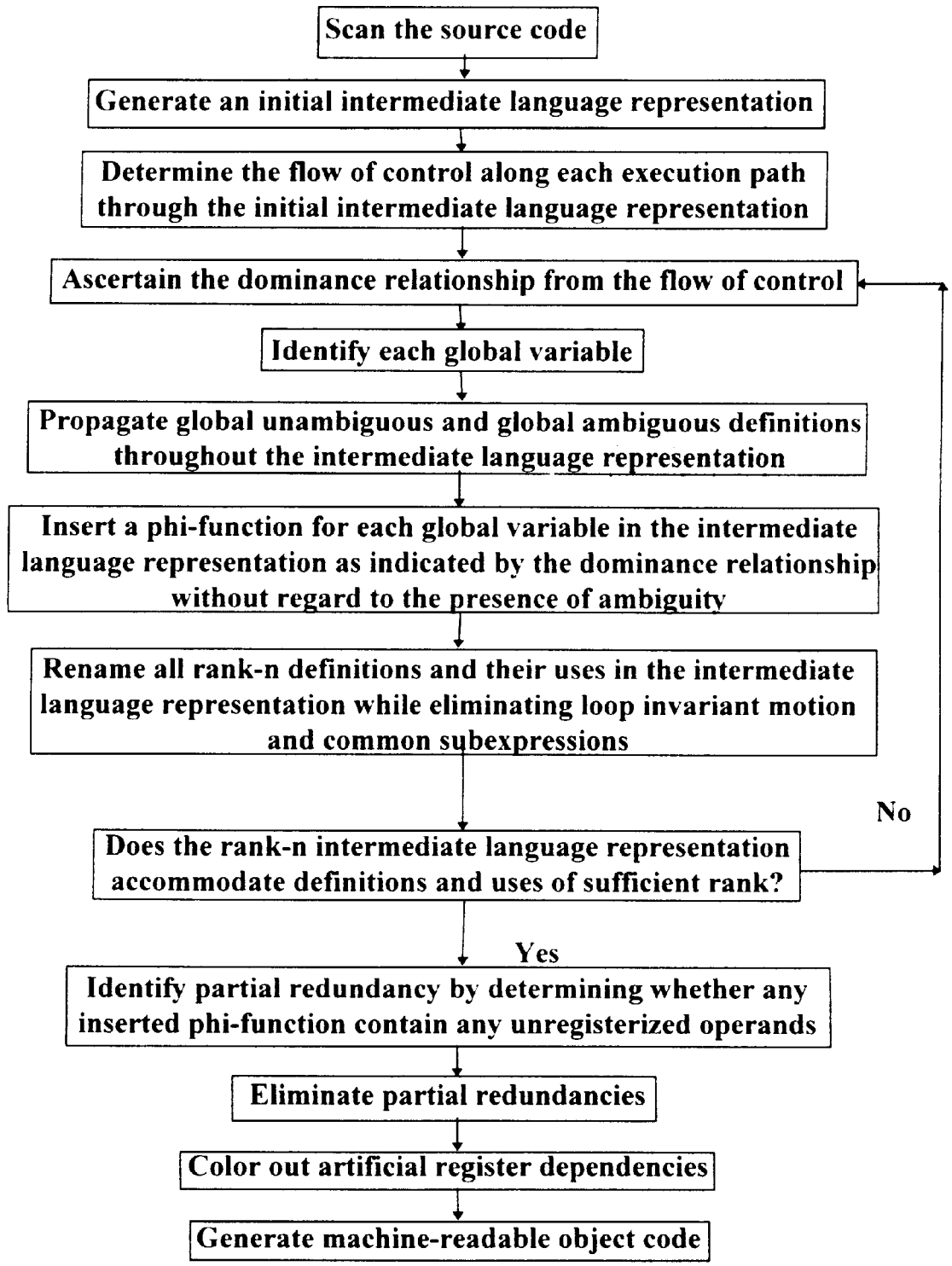
FIG. 9 is a flowchart illustrating one embodiment of the present invention incorporating a number of separate alternative embodiments.

Each of these applications was also previously incorporated by reference. Indeed, one alternative embodiment of the present invention incorporates all the variations discussed above as set forth in FIG. 9.

Any of the foregoing methods may be implemented by programming a suitable general device readable by the general purpose computer and encoding a program of purpose computer. The programming may be accomplished through the use of a program storage statements executable by the computer for performing the operations described above. The program storage device may take the form of, e.g., one or more floppy disks, a hard disk, a CD ROM or other optical or magnetic-optical disk, a magnetic tape, a read-only memory chip (ROM), and other kinds of storage devices. The program of statements may be source code or object code, or a high-level language, or in some intermediate form such as partially compiled code. The precise forms of the program storage device and of the encoding of statements are immaterial.

It will be appreciated by those of ordinary skill having the benefit of this disclosure that the illustrative embodiments described above are capable of numerous variations without departing from the scope and spirit of the invention. For instance, the teachings herein can be readily extrapolated to rename phi-nodes whose operands are subexpressions. While the particular embodiments disclosed above are presented utilizing C pseudo code, they are not limited to C. The invention may be applied to any computer program such as C++, FORTRAN, COBOL, PASCAL, etc. Furthermore, the methods may by performed on a computer program written or stored in object code or machine language as well as source code. Still further, the methods may be performed on a computer program stored in an intermediate compiler language that may be utilized to perform other optimizations prior to translation to object code.

Accordingly, the exclusive rights sought herein are as described in the claims below.

What is claimed is:

1. A method for eliminating common subexpressions in an initial SSA intermediate language representation of at least a portion of a computer program, the method comprising:
   (a) inserting a phi-node for an unambiguous definition used in an unambiguous subexpression reaching a join point in the initial intermediate language subsequent to the join point;
   (b) inserting a phi-node for the unambiguous common subexpression;
   (c) renaming the unambiguous definition and a subsequent use reached by the definition; and
   d) renaming the unambiguous common subexpression.

2. The method of claim 1, wherein phi-nodes are inserted in the absence of ambiguity.

3. The method of claim 1, wherein phi-nodes are inserted for each global variable.

4. The method of claim 1, wherein the act of renaming the definition and the subsequent use comprises:
   (1) performing a depth-first ordered traversal of a list of terminal nodes including the unambiguous definition and the subsequent use;
   (2) renaming the unambiguous definition when encountered during the traversal; and
   (3) renaming the subsequent use when encountered during the traversal.

5. The method of claim 1, wherein the act of renaming the definition and the subsequent use thereof comprises:
   (1) searching for a statement node containing the unambiguous definition reaching a statement node including the unambiguous use of the definition;
   (2) renaming the definition as a compiler temporary; and
   (3) renaming the use to the compiler temporary.

6. The method of claim 1, wherein renaming the unambiguous common expression comprises:
   (1) performing a depth-first ordered traversal of a list of interior nodes; and
   (2) renaming the unambiguous common subexpression when encountered during the traversal.

7. The method of claim 1, wherein renaming subexpressions comprises:
   (1) searching for expression nodes including an unambiguous common subexpression; and
   (2) renaming the common subexpression as a compiler temporary.

8. The method of claim 1, wherein acts (b) and (c) are performed in separate passes through the intermediate language representation.

9. The method of claim 1, wherein the method is iterated until the SSA intermediate language representation accommodates each definition in the initial intermediate language representation.

10. The method of claim 1, further comprising:
    (a) translating as SSA intermediate language resulting from acts (b)–(c) into object code.

11. A method for eliminating common subexpressions while compiling at least a portion of a computer program into machine readable object code, the method comprising:
    (a) creating an intermediate language of the portion of the source code;
    (b) inserting a phi-node in the intermediate language for an unambiguous definition used in an unambiguous subexpression reaching a join point;
    (c) renaming the unambiguous definition and any subsequent use of the definition;
    (d) renaming the unambiguous common subexpression.; and
    (e) translating the resultant SSA intermediate language representation into object code.

12. The method of claim 11, wherein creating an intermediate language includes scanning the source code, creating a statement node, and creating an expression node.

13. The method of claim 12, wherein the intermediate language representation includes a plurality of statement nodes and a plurality of expression nodes.

14. The method of claim 11, wherein phi-nodes are inserted in the absence of ambiguity.

15. The method of claim 11, wherein phi-nodes are inserted for each global variable.

16. The method of claim 11, wherein the act of renaming definitions and subsequent uses thereof comprises:
    (1) performing a depth-first ordered traversal of a list of terminal nodes;
    (2) renaming the unambiguous definition when encountered while traversing the list of terminal nodes; and
    (3) renaming the use reached by the renamed, unambiguous definition when encountered while traversing the list of terminal nodes.

17. The method of claim 11, wherein the act of renaming the definition and the subsequent use comprises:
    (1) searching for statement nodes containing the unambiguous definition reaching a statement node including an unambiguous use of the definition;
    (2) renaming the definition as a compiler temporary; and
    (3) renaming the use to the compiler temporary.

18. The method of claim 11, wherein renaming unambiguous common subexpression comprises:
    (1) performing a depth-first ordered traversal of a list of interior nodes; and
    (2) renaming the unambiguous common subexpression when encountered while traversing the list of interior nodes.

19. The method of claim 11, wherein renaming subexpressions comprises:

(1) searching for expression nodes including the unambiguous common subexpression; and
(2) renaming the common subexpression as a compiler temporary.

20. The method of claim 11, wherein acts (b) and (c) are performed in separate passes.

21. The method of claim 11, wherein acts (a), (b), and (c) are iterated until the SSA intermediate language representation accommodates each definition in the initial intermediate language representation and any subsequent use of the definition.

22. The method of claim 11, further comprising:
(f) translating the resultant SSA intermediate language into object code.

23. A method for eliminating common subexpressions while compiling at least a portion of source code into machine readable object code, the method comprising:
(a) creating an initial intermediate language, including:
(1) scanning the source code;
(2) creating statement nodes;
(3) creating expression nodes;
(4) constructing an expression tree for each expression node;
(5) initializing a list of interior nodes for each expression tree; and
(6) initializing a list of terminal nodes for each expression tree;
(b) inserting a phi-node in the initial intermediate language for each unambiguous global variable and each unambiguous subexpression in the initial intermediate language;
(c) renaming each unambiguous definition and any subsequent use of the definition, the renaming including:
(1) searching for statement nodes containing an unambiguous definition that reaches a statement node containing an unambiguous use of the definition by performing a depth-first ordered traversal of a list of terminal nodes;
(2) renaming each unambiguous definition in the list of terminal nodes encountered while traversing the list of terminal nodes to a compiler temporary; and
(3) renaming uses reached by a renamed, unambiguous definition in the list of terminal nodes while traversing the list of terminal nodes to the compiler temporary;
(d) renaming each unambiguous common subexpression.; and
(e) translating the resultant SSA intermediate language representation into object code.

24. A program storage device readable by a general purpose computer, the program storage device being encoded with statements implementing a method for eliminating common subexpressions in a SSA intermediate language representation of at least a portion of a computer program, the method comprising:
(a) inserting a phi-node for an unambiguous definition used in an unambiguous subexpression reaching a join point in the intermediate language subsequent to the join point;
(b) inserting a phi-node for the unambiguous common subexpression;
(c) renaming the unambiguous definition and a subsequent use reached by the definition; and
(d) renaming the unambiguous common subexpression.

25. The device of claim 24, wherein phi-nodes are inserted in the absence of ambiguity.

26. The device of claim 24, wherein phi-nodes are inserted for each global variable.

27. The device of claim 24, wherein the act of renaming the definition and the subsequent use comprises:
(1) performing a depth-first ordered traversal of a list of terminal nodes including the unambiguous definition and the subsequent use;
(2) renaming the unambiguous definition when encountered while traversing the list of terminal nodes; and
(3) renaming the subsequent use when encountered while traversing the list of terminal nodes.

28. The device of claim 24, wherein the acts of renaming the definition and the subsequent use comprises:
(1) searching for a statement node containing the unambiguous definition reaching a statement node including the unambiguous use of the definition;
(2) renaming the definition as a compiler temporary; and
(3) renaming the use to the compiler temporary.

29. The device of claim 24, wherein the act of renaming the unambiguous common expression comprises:
(1) performing a depth-first ordered traversal of a list of interior nodes; and
(2) renaming the unambiguous common subexpression when encountered while traversing the list of interior nodes.

30. The device of claim 24, wherein the acts of renaming subexpressions comprises:
(1) searching for expression nodes including an unambiguous common subexpression; and
(2) renaming the common subexpression as a compiler temporary.

31. The device of claim 24, wherein acts (b) and (c) are performed in separate passes through the intermediate languages representation.

32. The device of claim 24, wherein the method is iterated until the SSA intermediate language representation accommodates each definition in the initial intermediate language representation.

33. The device of claim 24, further comprising:
(a) translating an SSA intermediate language resulting for acts (b)–(c).

34. A program storage device readable by a general purpose computer, the program storage device being encoded with statements implementing a method for eliminating common subexpressions while compiling at least a portion of a computer program, the method comprising:
(a) creating an intermediate language of the portion of the computer program;
(b) inserting a phi-node in the intermediate language an unambiguous definition used in an unambiguous subexpression reaching a join point;
(c) renaming the unambiguous definition and any subsequent use of the definition;
(d) renaming the unambiguous common subexpression.; and
(e) translating the resultant SSA intermediate language representation into object code.

35. The device of claim 34, wherein creating an intermediate language includes scanning the source code, creating a statement node, and creating an expression node.

36. The device of claim 34, wherein the intermediate language representation includes a plurality of statement nodes and a plurality of expression nodes.

37. The device of claim 34, wherein phi-nodes are inserted in the absence of ambiguity.

38. The device of claim 34, wherein the act of inserting phi-nodes is performed for each global variable.

39. The device of claim 34, wherein the act of renaming the definition and the subsequent use comprises:

(1) performing a depth-first ordered traversal of a list of terminal nodes;

(2) renaming the unambiguous definition when encountered while traversing the list of terminal nodes; and (3) renaming the use reached by the renamed, unambiguous definition when encountered while traversing the list of terminal nodes.

40. The device of claim 34, wherein the act of renaming the definition and the subsequent use comprises:

(1) searching for a statement node containing the unambiguous definition reaching a statement node including the unambiguous use of the definition;

(2) renaming the definition as a compiler temporary; and (3) renaming the use to the compiler temporary.

41. The device of claim 34, wherein renaming the unambiguous common subexpression comprises:

(1) performing a depth-first ordered traversal of a list of interior;

(2) renaming the unambiguous common subexpression when encountered during the traversal.

42. The device of claim 34, wherein renaming subexpressions comprises:

(1) searching for expression nodes including an unambiguous common subexpression; and (2) renaming the common subexpression as a compiler temporary.

43. The device of claim 34, wherein acts (b) and (c) are performed in separate passes through the intermediate language representation.

44. The device of claim 34, wherein the method iterated until the SSA intermediate language representation accommodates each definition in the initial intermediate language representation and any subsequent use of the definition.

45. The device of claim 34, further comprising:

(f) translating an SSA intermediate language resulting from acts (b)–(c) into object code.

\* \* \* \* \*

UNITED STATES PATENT AND TRADEMARK OFFICE
CERTIFICATE OF CORRECTION

PATENT NO.    : 6,002,879
DATED         : December 14, 1999
INVENTOR(S)   : Radigan et al.

It is certified that error appears in the above-identified patent and that said Letters Patent is hereby corrected as shown below:

Column 1,
Line 54, delete "modem", insert -- modern --.

Signed and Sealed this

Tenth Day of June, 2003

JAMES E. ROGAN
*Director of the United States Patent and Trademark Office*